Nov. 8, 1960     R. P. LAZICH     2,959,449
AUXILIARY EMERGENCY BRAKE
Filed April 30, 1959     4 Sheets-Sheet 1
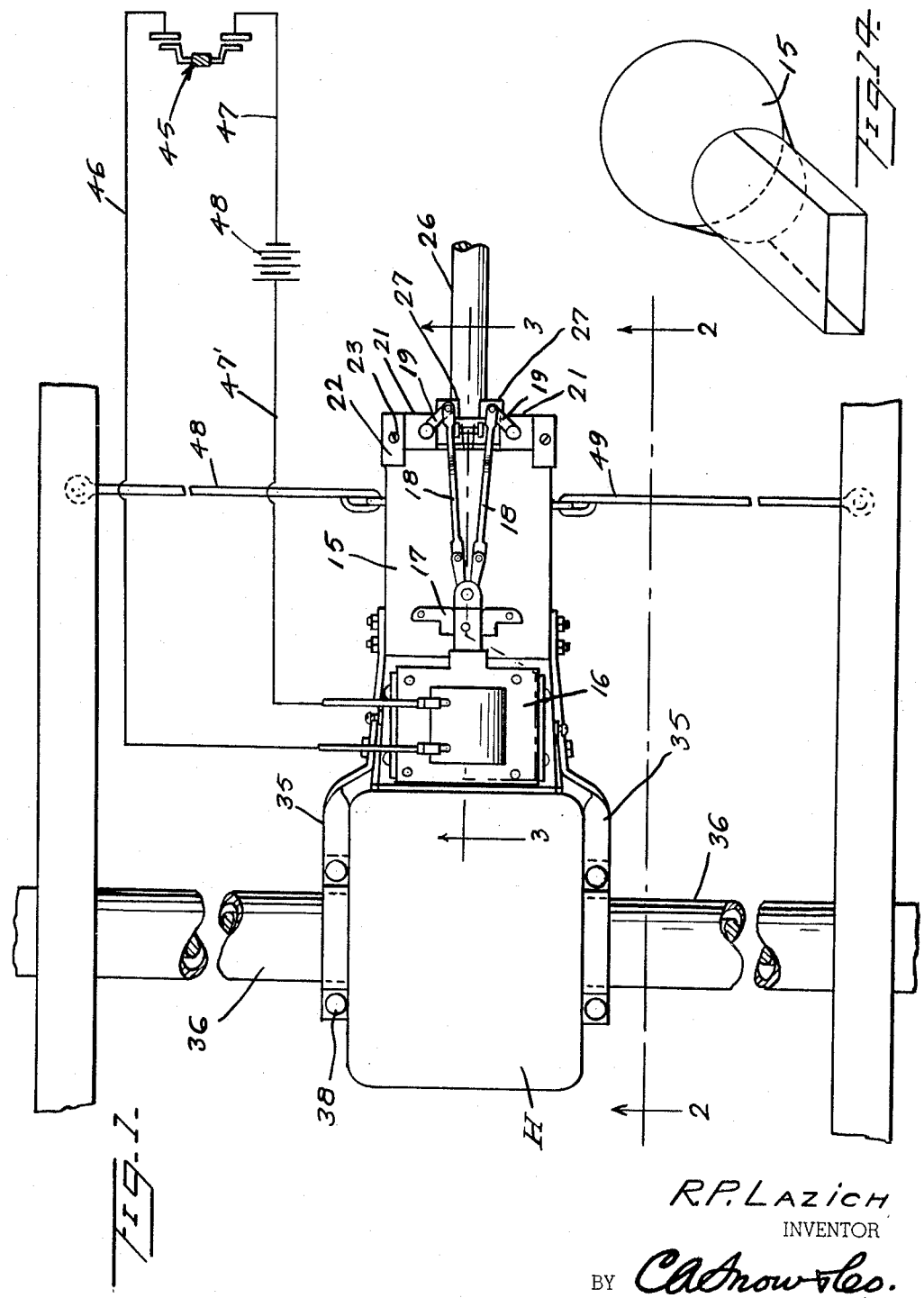
R.P. Lazich
INVENTOR
BY C.A. Snow & Co.
ATTORNEYS.

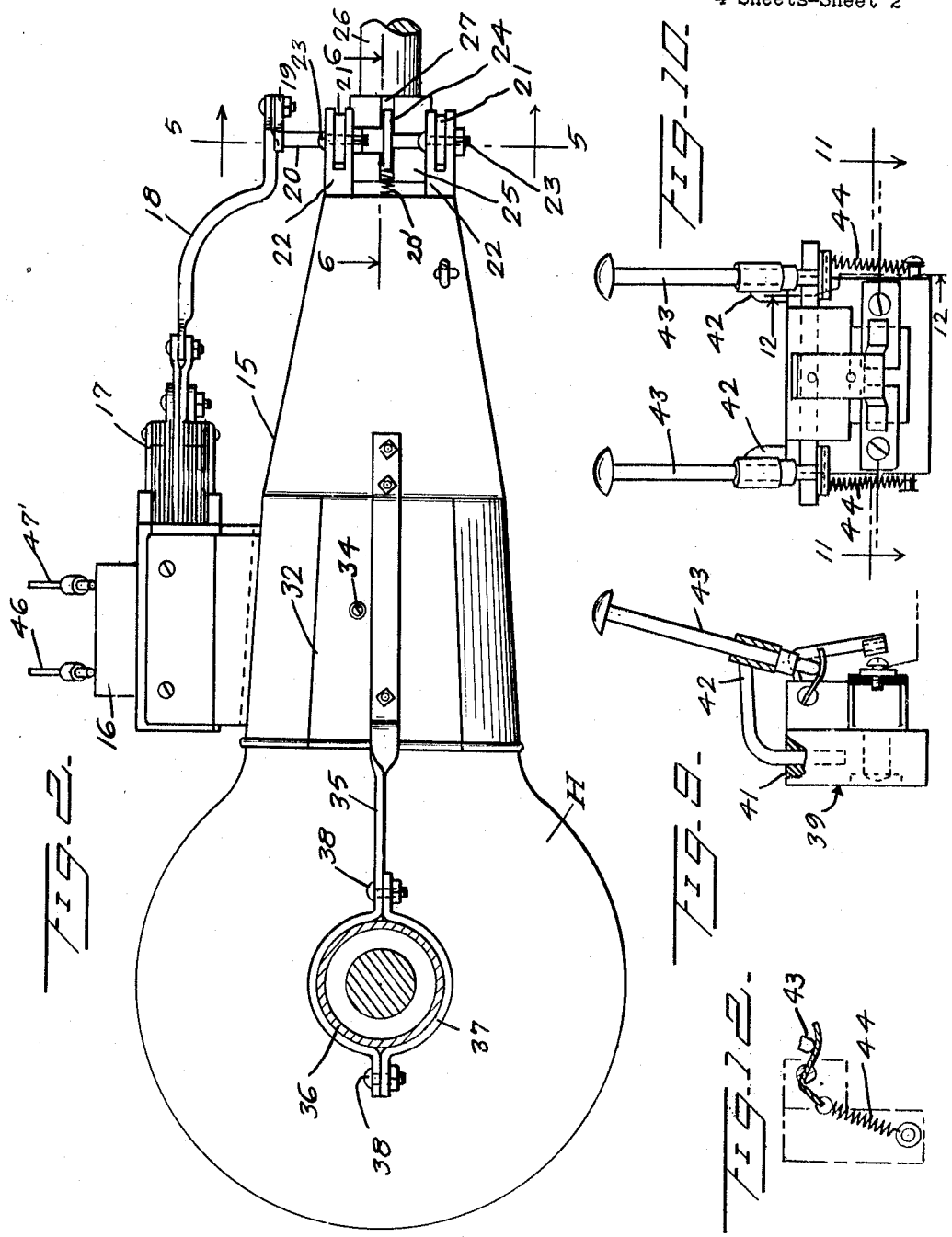

Nov. 8, 1960 R. P. LAZICH 2,959,449
AUXILIARY EMERGENCY BRAKE
Filed April 30, 1959 4 Sheets-Sheet 3
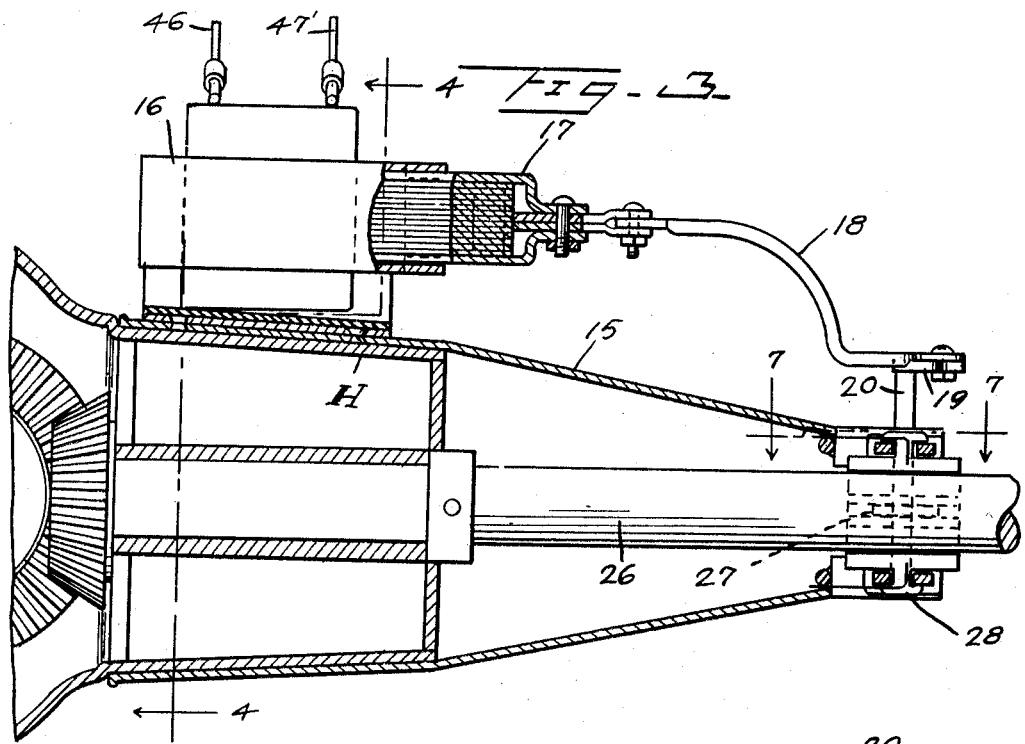
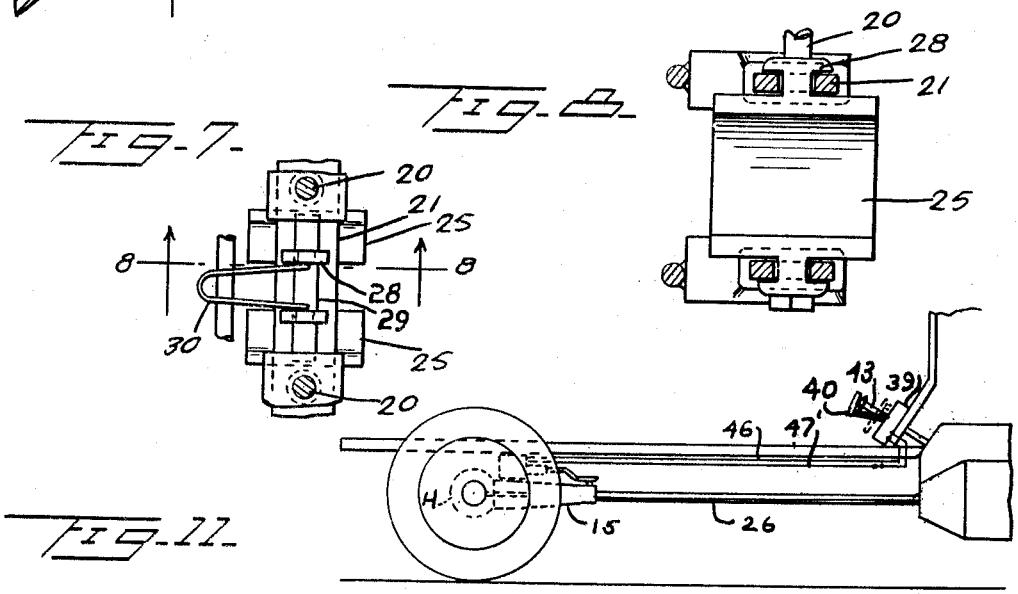
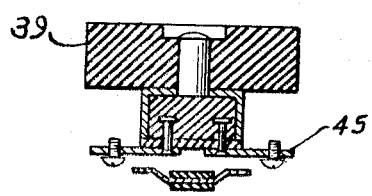
R. P. LAZICH
INVENTOR
BY C. A. Snow & Co.
ATTORNEYS.

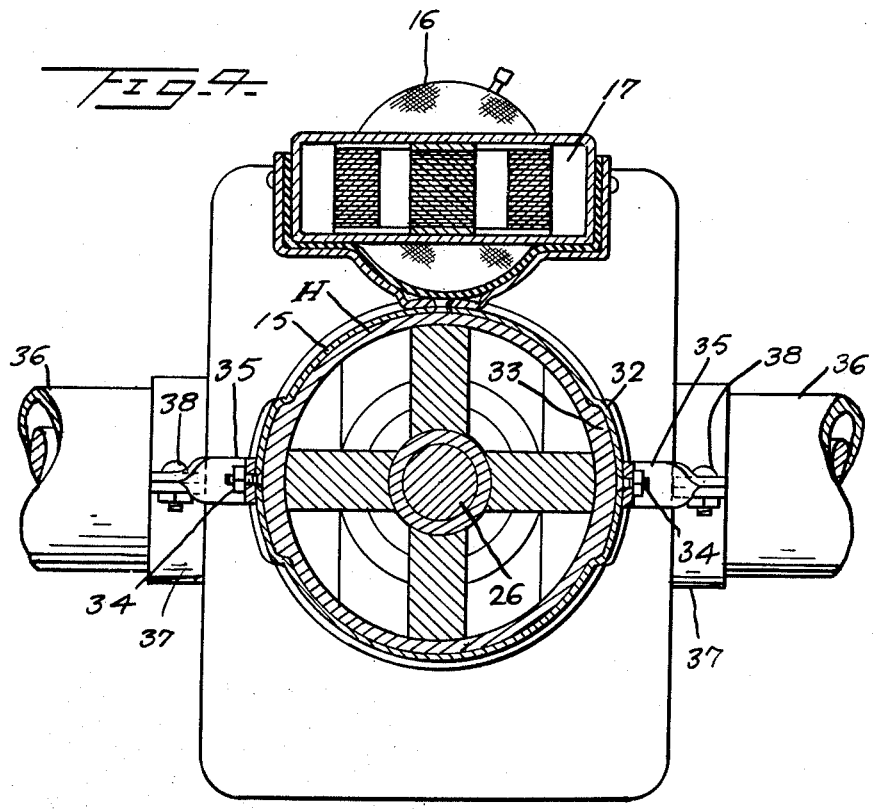
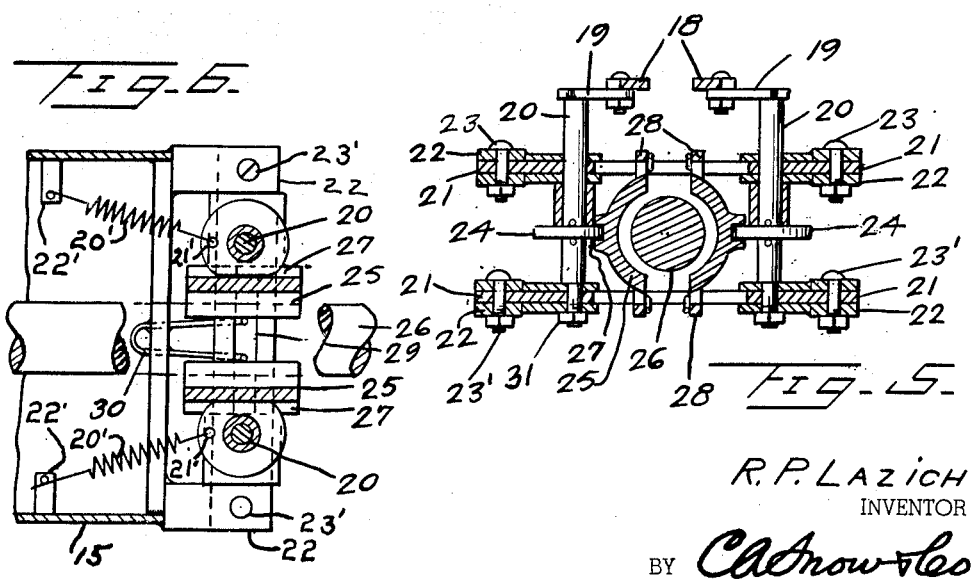

United States Patent Office
2,959,449
Patented Nov. 8, 1960

2,959,449

AUXILIARY EMERGENCY BRAKE

Radovan P. Lazich, 2735 Kroy Way, Sacramento, Calif.

Filed Apr. 30, 1959, Ser. No. 810,063

1 Claim. (Cl. 303—3)

This invention relates to auxiliary emergency brakes, and more particularly to brakes that clamp around the drive shaft of a vehicle rather than around the drums on the wheels.

An object of this invention is the provision of an auxiliary emergency brake that will automatically be applied when the regular braking system fails and the brake pedal is forced to the floor board when pressure is applied to slow down or stop the vehicle.

Another object of this invention is the provision of an auxiliary emergency brake that can be readily installed in a vehicle by a mechanic or person having experience or knowledge of the automotive arts.

Another object of this invention is the provision of an auxiliary emergency brake that can be operated as a third completely independent braking system on a vehicle, having no connection with either the usual foot brake or hand operated emergency brake.

Still another object of this invention is the provision of an auxiliary emergency brake that is operated by electricity, and can therefore be readily installed on vehicles wherein the normal brake system is either the mechanically or hydraulically operated type.

Other and further objects and advantages of this invention will be hereinafter described, and the novel features thereof defined in the appended claim.

Referring to the drawings:

Figure 1 is a plan view of this invention.

Fig. 2 is a sectional view taken substantially along line 2—2 of Fig. 1 as viewed in the direction indicated by the arrows.

Fig. 3 is a sectional view taken substantially along line 3—3 of Fig. 1 as viewed in the direction indicated by the arrows.

Fig. 4 is a sectional view taken substantially along line 4—4 of Fig. 3 as viewed in the direction indicated by the arrows.

Fig. 5 is a sectional view taken substantially along line 5—5 of Fig. 2 as viewed in the direction indicated by the arrows.

Fig. 6 is a sectional view taken substantially along line 6—6 of Fig. 2 as viewed in the direction indicated by the arrows.

Fig. 7 is a sectional view taken substantially along line 7—7 of Fig. 3 as viewed in the direction indicated by the arrows.

Fig. 8 is a sectional view taken substantially along line 8—8 of Fig. 7 as viewed in the direction indicated by the arrows.

Fig. 9 is a side elevational view of a detail of this invention.

Fig. 10 is an end view of Fig. 9.

Fig. 11 is a sectional view taken substantially along line 11—11 of Fig. 10 as viewed in the direction indicated by the arrows.

Fig. 12 is a sectional view taken substantially along line 12—12 of Fig. 10 as viewed in the direction indicated by the arrows.

Fig. 13 is a side elevational view of this invention installed on a vehicle.

Fig. 14 is a perspective view of a detail of this invention.

Similar reference characters refer to similar parts throughout the several views of the drawings.

Having reference now to the drawings in detail, and in particular to Figs. 1, 2 and 13, there is generally indicated by the reference character 15 a housing having the configuration best illustrated by the perspective view noted in the appended drawings as Fig. 14.

A solenoid 16 having a plunger 17 is adapted to the top of the housing 15 in order that one end of levers 18 may be pivotally secured to the external end of the plunger 17. The other ends of the levers 18 are pivotally secured to horizontal levers 19 adapted to the head of cam operating shafts 20 which are supported by bearing plates 21 secured at each end of the U-shaped members 22 in which they are adapted, as best shown in Figs. 2 and 5 of the drawings. U-shaped members 22 are fixed to the small end of the housing 15 as will be further described in the installation of this invention on a vehicle.

Mounting screws 23 not only hold bearing plate 21 in place, but also all of the adjacent members which go to make up the actual braking mechanism of this invention.

Semicircular cams 24 are pinned or otherwise secured to cam operating shafts 20 in order that they may press brake shoe 25 against drive shaft 26 of the vehicle as they ride in grooves 27 of the brake shoe 25. Each of the brake shoes 25 are of semicircular configuration when viewed endwise, and terminate in guide lugs 28 which are parallel to one another. The lugs of the brake shoes are adapted to slide within, and project slightly above the slots 29 of bearing plates 21, in order that one end of U-shaped spring 30 may press against the lugs 28 of brake shoe 25 in order to keep the brake shoes off the drive shaft 26 until application of this auxiliary emergency brake.

When installing this device, it is only necessary to remove two of the mounting screws herein characterized by the numerals 23' that hold the bottom bearing plates in place, as well as the two nuts 31 on the lower end of cam operating shaft 20. The bottom bearing plate noted by the reference character 21 is now dropped down, and this in turn automatically opens up the space between the brake shoes so that this entire device may now be slipped on the drive shaft 26 of a vehicle, after it has been disconnected at the joints. The joint is now connected back again and the housing 15 adapted to the differential housing H of the vehicle. It will be noted from examination of Fig. 4 of the drawings that the contour of the housing 15 of this device contains hollow ribs 32 that mate with the ribs 33 of the housing H. Bolts 34 in ribs 32 are tightened against the differential housing thus giving additional rigidity to this auxiliary emergency brake.

Additional stability is given to this device by means of brace members 35 that are bolted on each side of housing 15 as shown in the plan view which is given as Fig. 1 of the appended drawings. The outer ends of brace members 35 are curved around the actual shaft housing 36 of the vehicle to which they are secured by clamps 37 and bolts 38.

The major portion of this invention has now been described, and it only remains to tell of the operating switch 39 which is located directly under brake pedal 40 of the vehicle, as clearly shown in Fig. 13 of the drawings.

The aforesaid operating switch 39 comprises a base 41, a plurality of lever-supporting members 42, and a plurality of levers 43 slidably held in members 42. The upper ends of said levers 43 are biased upwardly against the under side of brake pedal 40 by means of springs 44 as shown in Figs. 9, 10 and 12, which also clearly illustrate the electrical contacts noted by the reference character 45 in such a manner as to need no further explanation other than to note that there are two contact points, one for each of the two wires 46 and 47. Wire 47 is connected to one terminal of the battery 48 of the electrical system of the vehicle, while the other terminal of the battery is connected to wire 47' in this auxiliary emergency braking system. Both wires 46 and 47' are secured to the solenoid 16 as shown in Figs. 1, 2 and 3 of the drawings.

The operation of this invention is obvious from an examination of Figs. 1 and 13, in which it is seen that the brake pedal 40 is depressed to the floor boards of the vehicle. The pedal will then depress levers 43 in switch 39, thereby closing the electrical circuit which will activate the solenoid 16 causing levers 18 to move in such a manner as to operate the already described detailed mechanism of this invention. It is obvious that when the electric current is cut off by the release of the brake pedal 40, the U-shaped spring 30 will, as previously described, force open brake shoes 25 and release the braking effect on the drive shaft 26. It may be well to mention at this point that additional rigidity is given to this device by means of brace rods 49 and 50 which have one end secured to the frame of the vehicle, while the other end of each rod is secured to one side of housing 15, as illustrated by Fig. 1 of the appended drawings.

A coil spring 20' has one end secured to a pin 21' on cam 24, while the other end of the stated spring is attached to a lug 22' protruding from inside of housing 15.

The purpose of these springs is that when the solenoid 16 releases, the springs pull the cams 24 away from the brake shoe 25 so that spring 30 may hold the shoe apart so that they will not continuously be rubbing on the drive shaft 26.

From the foregoing it will now be seen that there is herein provided an improved auxiliary emergency braking mechanism which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative and not in a limiting sense.

I claim:

In an auxiliary emergency brake of a class wherein a brake mechanism encompasses the forward section of the differential housing of a vehicle, a drive shaft extending forwardly from said housing, the said brake mechanism being operated by means of a solenoid activated by an electric current, from a switch under and operated by the brake pedal on said vehicle when said brake pedal is fully depressed, the combination with said brake mechanism comprising a housing, a solenoid mounted on said housing, a pair of brake shoes encompassing said drive shaft and movably secured to the forward end of said brake mechanism, a source of electrical supply, an electric switch under said pedal, electric wires providing an electrical circuit between said solenoid, source of electrical supply and said switch when said brake pedal is fully depressed, bearing plates secured to the forward end of said brake mechanism housing, said bearing plates being parallel to one another and in spaced relation to one another, said drive shaft passing between said bearing plates, said bearing plates having elongated openings, said brake shoes having guide lugs passing through said elongated openings, a spring U-shaped in configuration, the ends of said spring pressing outwardlfy against said lugs normally holding said brake shoes in open position spaced from said drive shaft, a pair of cam operated shafts disposed at right angles to said bearing plates, said cam shafts being rotatably secured to said bearing plates, a cam secured to each of said operating shafts, grooves in said brake shoes, said cams freely riding in said grooves, rotary movement of said cam operating said brake shoes, and a system of levers connecting between said cam operating shafts and said solenoid.

References Cited in the file of this patent

UNITED STATES PATENTS

| | | |
|---|---|---|
| 1,505,134 | Du Pont | Aug. 19, 1924 |
| 1,558,721 | Thompson | Oct. 27, 1925 |
| 1,820,650 | Cadman | Aug. 25, 1931 |
| 1,906,733 | Bendix | May 2, 1933 |
| 1,987,273 | Strigl | Jan. 8, 1935 |
| 2,055,267 | Uffert | Sept. 22, 1936 |
| 2,146,159 | Scherer | Feb. 7, 1939 |
| 2,871,827 | Euga | Feb. 3, 1959 |